United States Patent
Stroud et al.

(10) Patent No.: US 10,759,115 B2
(45) Date of Patent: ***Sep. 1, 2020

(54) POWDER-LAYER THREE-DIMENSIONAL PRINTER WITH SMOOTHING DEVICE

(71) Applicant: The ExOne Company, North Huntingdon, PA (US)

(72) Inventors: Adam W. Stroud, Rosharon, TX (US); Rick D. Lucas, Belmont, OH (US); Michael John McCoy, Murrysville, PA (US); Anthony S. Dugan, Irwin, PA (US); Joseph J. Bolt, Irwin, PA (US)

(73) Assignee: The ExOne Company, North Huntingdon, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/567,136

(22) Filed: Sep. 11, 2019

(65) Prior Publication Data

US 2020/0001530 A1 Jan. 2, 2020

Related U.S. Application Data

(63) Continuation of application No. 16/151,569, filed on Oct. 4, 2018, now Pat. No. 10,449,718.

(60) Provisional application No. 62/677,309, filed on May 29, 2018.

(51) Int. Cl.
*B29C 64/218* (2017.01)
*B29C 64/329* (2017.01)

(52) U.S. Cl.
CPC .......... *B29C 64/218* (2017.08); *B29C 64/329* (2017.08)

(58) Field of Classification Search
CPC ........................... B29C 64/218; B29C 64/329
See application file for complete search history.

(56) References Cited

U.S. PATENT DOCUMENTS

| | | | |
|---|---|---|---|
| 10,173,350 B2* | 1/2019 | Hikichi | B29C 64/112 |
| 2016/0311023 A1* | 10/2016 | Schirtzinger | B28B 13/0295 |
| 2016/0311164 A1* | 10/2016 | Miyano | B05D 1/12 |
| 2017/0341365 A1* | 11/2017 | De Lajudie | B22F 3/1055 |
| 2018/0147781 A1* | 5/2018 | Kobayashi | B33Y 30/00 |

* cited by examiner

*Primary Examiner* — Nahida Sultana
(74) *Attorney, Agent, or Firm* — Philip D. Lane

(57) ABSTRACT

Powder layer smoothing devices (34) adapted for use with powder-layer three-dimensional printers (10) are described. The smoothing devices (34) include a counter rotating roller (36, 50, 60) having a complex powder engaging face (38) that may include a series or plurality of flutes (54) or may include knurling (64) extending along at least a portion of the counter rotating roller (36, 50, 60) along its rotational axis (56, 66). The smoothing device (34) may also include a vertically adjustable finishing roller (35) to follow the counter rotating roller (36, 50, 60) across the build box (12) of the powder-layer three-dimensional printer (10).

14 Claims, 5 Drawing Sheets

POWDER-LAYER THREE-DIMENSIONAL PRINTER WITH SMOOTHING DEVICE

BACKGROUND

Field of the Invention

The present invention relates to powder-layer three-dimensional printers having a smoothing device that includes a counter rotating roller with a complex powder engaging face.

Background of the Art

There are today various types of three-dimensional printers, i.e. devices that convert electronic representations of three-dimensional articles into the articles themselves by the systematic building-up of one or more materials. The device of the present invention finds particular utility with the types of three-dimensional printers which create three-dimensional articles by selectively binding together preselected areas of successively deposited layers of powder. These types of three-dimensional printers are referred to herein as "powder-layer three-dimensional printers" because the construction of the three-dimensional article by such printers utilizes layers of powders as a build material. Examples of such types of powder-layer three-dimensional printers include, without limitation, the binder-jet three-dimensional printers, the selective sintering three-dimensional printers, and the electron beam melting three-dimensional printers.

It is to be understood that the term "powder" is also sometimes referred to in the art as "particulate material" or "particles" and the term "powder" is to be construed herein as meaning any such material, by whatever name, that is used in such three-dimensional printers as a layer-forming material. Powder may comprise any type of material capable of taking on the powder form, e.g. metal, plastics, ceramics, carbon, graphite, composite materials, minerals, etc., and combinations thereof. The term "build powder" is used herein to refer to a powder which is used to form the powder layers and from which the article is built in a powder-layer three-dimensional printer.

During the operation of a powder-layer three-dimensional printer, a first layer of a build powder is deposited upon a vertically indexible build platform and then successive powder layers are deposited one at a time upon the first powder layer. Selected portions of selected powder layers are treated to bind the powders in those portions together as one or more three-dimensional articles are formed. Collectively, the portions of the deposited powder layers which are not bound together are referred to herein as a "powder bed."

The process of forming a powder layer is sometimes referred to in the art, and is referred to herein, as "recoating." The device or combination of devices of a particular powder-layer three-dimensional printer that accomplishes the recoating is sometimes referred to in the art, and is referred to herein, as a "powder recoater" or more simply as a "recoater."

In some powder-layer three-dimensional printers, each powder layer is formed by transferring a predetermined quantity of build powder from an open-top stationary powder reservoir by first indexing upward a platform which supports the powder within the reservoir a predetermined amount to raise the predetermined quantity above the reservoir walls and then pushing that quantity of powder across the top of the build platform or the powder bed, e.g. by a doctor blade or a counter-rotating roller, to form a powder layer. Examples of such recoaters are described in U.S. Pat. No. 5,387,380 to Cima et al. Such recoaters are generally limited for use with relatively small size powder beds, i.e. those which having recoating direction lengths of under a few tens of centimeters.

In some powder-layer three-dimensional printers, each powder layer is deposited upon the build platform or upon an extant powder bed by a recoater comprising a traveling powder dispenser which dispenses a build powder through an open slit as it traverses across the build platform or powder bed. Examples of such recoaters are described in U.S. Pat. No. 7,799,253 B2 to Hochsmann et al. Such recoaters may or may not include some device which is adapted to smoothen the top of the powder layer. As used herein, the term "smoothen" is to be interpreted as meaning operating on a quantity of powder so as to do at least one of (a) form at least a portion of the quantity of powder into a layer, (b) make at least a portion of the surface of a layer comprising the quantity of powder less rough, and (c) compress at least a portion of a layer comprising the quantity of powder. A mechanism which smoothens a quantity of powder is referred to herein as a "smoothing device."

An example of a prior art recoater having a smoothing device is shown in FIGS. 1A and 1B. Referring to FIG. 1A, there is shown a prior art recoater 2 comprising a bridge section 3 having at its ends first and second trolley mounts 4a, 4b which are adapted to attach the recoater 2 to a pair of parallel trollies (not shown) for selectively moving the recoater 2 across a powder bed (not shown). Referring now to FIG. 1B, there is shown a cross-sectional view of the recoater 2 taken along cutting plane 1B-1B in FIG. 1A. The recoater 2 includes an upper powder reservoir 5, a powder dispensing mechanism 7, and a powder smoothing device in the form of a motorized counter-rotating roller 6 having a smooth cylindrical face. During operation, the recoater 2 travels in the direction indicated by the arrow A dispensing powder (not shown) from the upper powder reservoir 5 and the lower powder reservoir 8 through a valve onto the powder support plate 9 and therefrom onto the powder bed (not shown). The counter rotating roller 6 follows the powder dispensing mechanism 7 and contacts the deposited powder with the smooth face of the roller so as to smoothen the deposited powder.

Although the smooth faced cylindrical rollers existing in the art today generally work for their intended purposes, there is room for improvement with regard to recoating speed for the smoothing of deposited powders. Even a small increase in speed of the smoothing of a single layer becomes significant when multiplied the hundreds or thousands number of layers needed to produce an article or articles in a powder bed.

SUMMARY OF THE INVENTION

The present invention provides powder-layer three-dimensional printers comprising a build box adapted to contain a powder bed, a smoothing device comprising a counter rotating roller having a rotational axis and complex powder engaging face extending along the rotational axis, and a carriage adapted to move the smoothing device across the build box.

In some embodiments of the counter rotating at least a portion of the complex powder engaging face comprises at least one flute extending along the rotational axis. The at least one flute may comprise a straight groove parallel with the rotational axis or may comprise a helical flute twisting around the rotational axis. The helical flute may have a twist ratio ranging from about 1 to about 0.75 inches to about 1 to about 50 inches.

Still further the counter rotating roller may include a complex powder engaging face comprising knurling extending along the rotational axis. In some embodiments, the knurling may comprise a pattern of diamonds or a pattern of straight ridges.

Embodiments of the smoothing device of the powder-layer three-dimensional printer may further comprise a vertically adjustable finishing roller positioned on the carriage such that the finishing roller follows the counter rotating roller as the carriage moves across the build box. In some embodiments, the powder dispenser may be positioned on the carriage such that the counter rotating roller is positioned between the powder dispenser and the vertically adjustable finishing roller. In additional embodiments, the powder dispenser and the smoothing device are are independently moveable.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention.

DESCRIPTION OF PREFERRED EMBODIMENTS

Figure 1A:
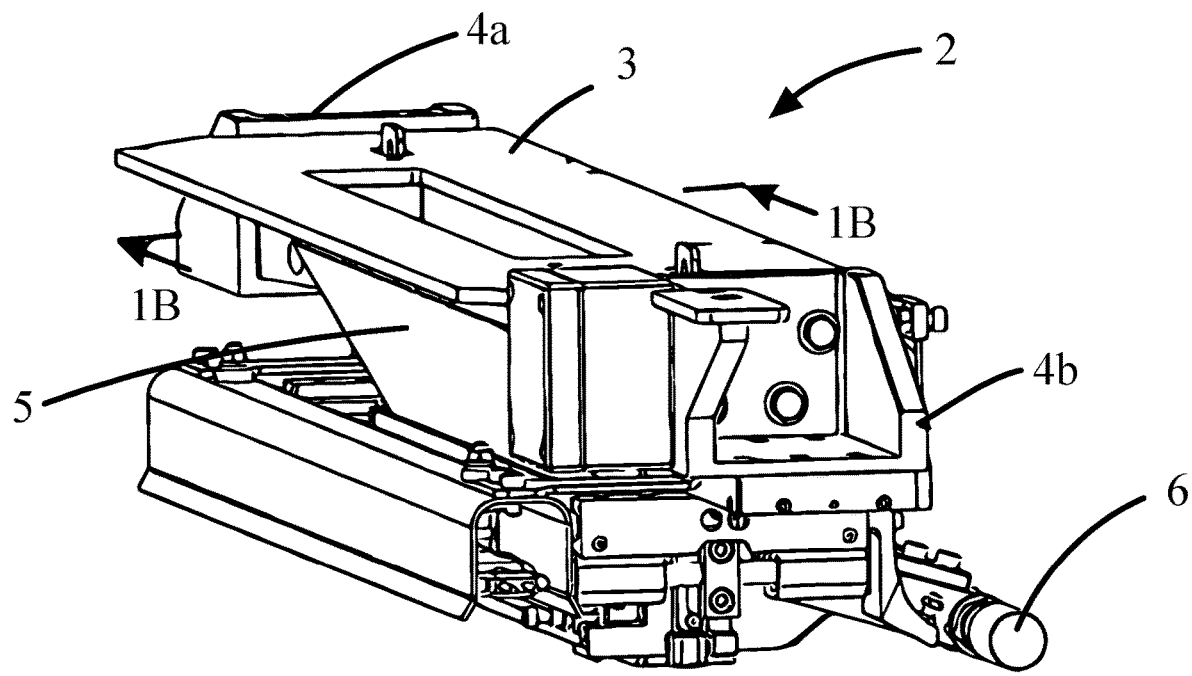
FIG. 1A is an isometric view of a prior art recoater having a powder dispensing mechanism and a counter rotating roller.

Some preferred embodiments of the present invention are described in this section in detail sufficient for one skilled in the art to practice the present invention without undue experimentation. It is to be understood, however, that the fact that a limited number of preferred embodiments are described in this section does not in any way limit the scope of the present invention as set forth in the claims.

It is to be understood that whenever a range of values is described herein, i.e. whether in this section or any other part of this patent document, that the range includes the end points and every point therebetween as if each and every such point had been expressly described. Unless otherwise stated, the words "about" and "substantially" as used herein are to be construed as meaning the normal measuring and/or fabrication limitations related to the value or condition which the word "about" or "substantially" modifies. Unless expressly stated otherwise, the term "embodiment" is used herein to mean an embodiment of the present invention.

The recoaters of the present invention have particular utility with powder-layer three-dimensional printers. Although the recoaters may be used with any type of powder-layer three-dimensional printers, for the sake of conciseness, the only type of powder-layer three-dimensional printers that will be discussed in this section are those of the binder-jetting three-dimensional printer type. The binder-jetting three-dimensional printers are also sometimes in the art referred to as "three-dimensional inkjet printers" because the binder jetting is done using a print head that resembles those developed for inkjet printing. The basic binder jetting three-dimensional printing process was invented 1980's and developed in the 1990's at the Massachusetts Institute of Technology and is described in several United States patents, including the following U.S. Pat. No. 5,490,882 to Sachs et al., U.S. Pat. No. 5,490,962 to Cima et al., U.S. Pat. No. 5,518,680 to Cima et al., U.S. Pat. No. 5,660,621 to Bredt et al., U.S. Pat. No. 5,775,402 to Sachs et al., U.S. Pat. No. 5,807,437 to Sachs et al., U.S. Pat. No. 5,814,161 to Sachs et al., U.S. Pat. No. 5,851,465 to Bredt, U.S. Pat. No. 5,869,170 to Cima et al., U.S. Pat. No. 5,940,674 to Sachs et al., U.S. Pat. No. 6,036,777 to Sachs et al., U.S. Pat. No. 6,070,973 to Sachs et al., U.S. Pat. No. 6,109,332 to Sachs et al., U.S. Pat. No. 6,112,804 to Sachs et al., U.S. Pat. No. 6,139,574 to Vacanti et al., U.S. Pat. No. 6,146,567 to Sachs et al., U.S. Pat. No. 6,176,874 to Vacanti et al., U.S. Pat. No. 6,197,575 to Griffith et al., U.S. Pat. No. 6,280,771 to Monkhouse et al., U.S. Pat. No. 6,354,361 to Sachs et al., U.S. Pat. No. 6,397,722 to Sachs et al., U.S. Pat. No. 6,454,811 to Sherwood et al., U.S. Pat. No. 6,471,992 to Yoo et al., U.S. Pat. No. 6,508,980 to Sachs et al., U.S. Pat. No. 6,514,518 to Monkhouse et al., U.S. Pat. No. 6,530,958 to Cima et al., U.S. Pat. No. 6,596,224 to Sachs et al., U.S. Pat. No. 6,629,559 to Sachs et al., U.S. Pat. No. 6,945,638 to Teung et al., U.S. Pat. No. 7,077,334 to Sachs et al., U.S. Pat. No. 7,250,134 to Sachs et al., U.S. Pat. No. 7,276,252 to Payumo et al., U.S. Pat. No. 7,300,668 to Pryce et al., U.S. Pat. No. 7,815,826 to Serdy et al., U.S. Pat. No. 7,820,201 to Pryce et al., U.S. Pat. No. 7,875,290 to Payumo et al., U.S. Pat. No. 7,931,914 to Pryce et al., U.S. Pat. No. 8,088,415 to Wang et al., U.S. Pat. No. 8,211,226 to Bredt et al., and U.S. Pat. No. 8,465,777 to Wang et al.

For ease of description the powder discharge from the inventive recoaters is described at some places herein in terms of a desired amount of powder. It is to be understood that the present invention includes controlling one or both of the amount of powder discharged from an inventive recoater and the rate at which powder is discharged from the recoater.

Figure 2:
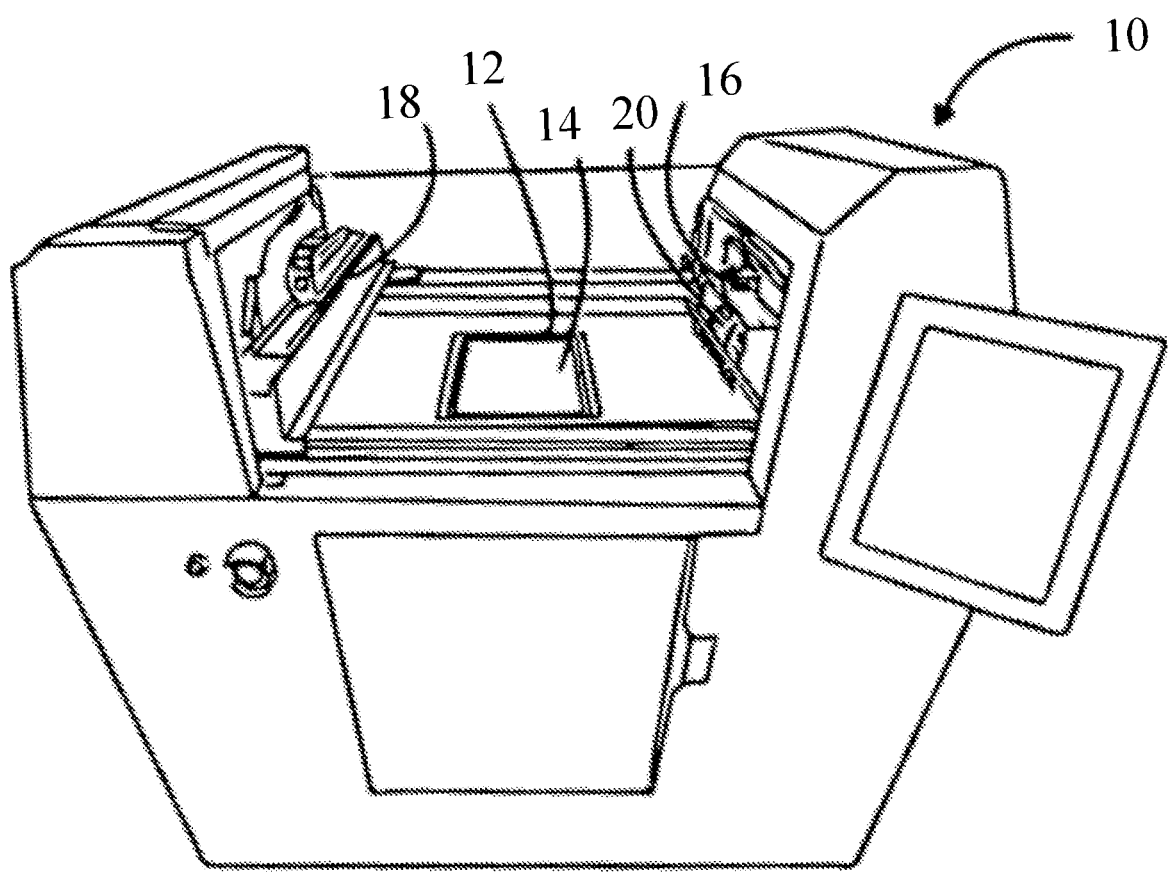
FIG. 2 is shown a schematic perspective view of an embodiment in the form of powder-layer three-dimensional printer 10.

Referring now to FIG. 2, there is shown a schematic perspective view of an embodiment in the form of powder-layer three-dimensional printer 10. The powder-layer three-dimensional printer 10 includes a removable build box 12 having a vertically indexible build platform (not visible) and containing a powder bed 14, a recoater 16, and a selectively positionable binder-jet printing device 18. During operation, the recoater 16 is moved over the build platform or powder bed 14 to deposit a powder layer thereupon. Typically the powder deposited by recoater 16 has surface imperfections that need to be removed or corrected prior to binder-jet printing device 18 applying binder to the powder bed. A smoothing device 20 is employed to smoothen the deposited powder to form a uniformly thick powder layer upon the pre-existing top surface of the powder bed 14. This may be accomplished during the traverse of the powder bed 14 by the recoater 16 during which the powder is dispensed or during a subsequent traverse of the powder bed 14. Another powder layer may then be deposited, if desired, or the binder-jet printing device 18 may then be moved over the powder bed 14 to selectively deposit binder onto the newly deposited layer and then moved back off of the powder bed 14 to permit the deposition of the next powder layer onto the powder bed 14.

Figure 3A:
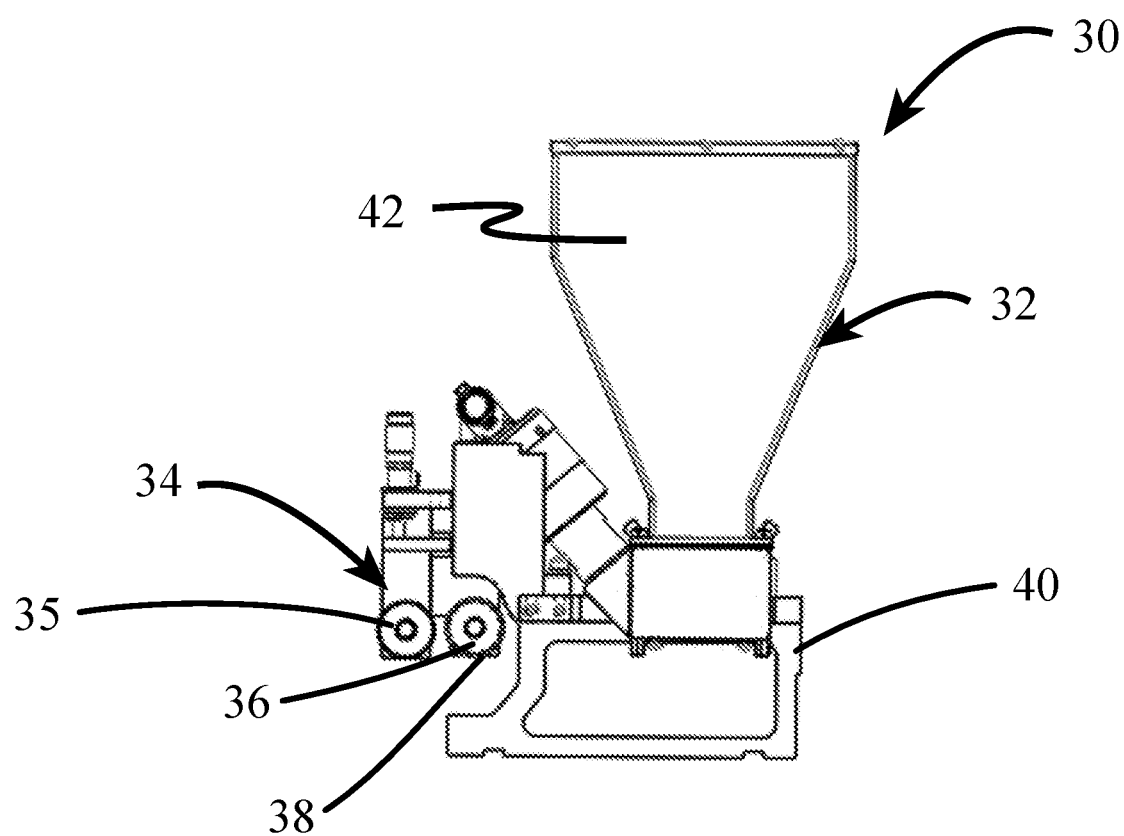
FIG. 3A is an isometric side view of an embodiment recoater.
Figure 3B:
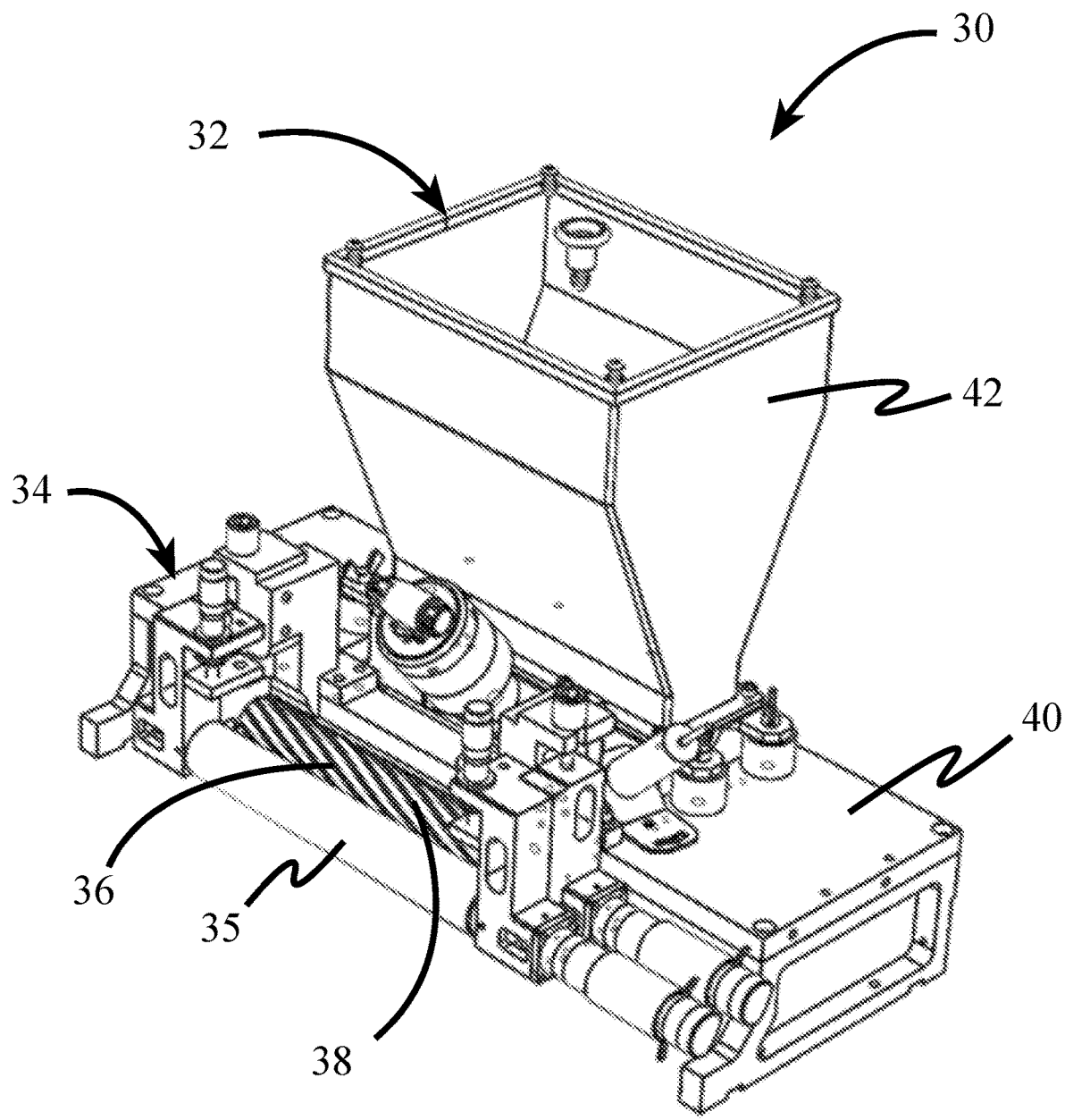
FIG. 3B is an isometric bottom perspective view of embodiment recoater xx.

Refer now to FIGS. 3A and 3B, which show, a side view, and side perspective views of an embodiment of a recoater 30 adapted for use with a powder layer three-dimensional printer. The recoater 30 includes a traveling powder dispenser 32 and a smoothing device 34 that includes a motor driven counter rotating roller 36 with a complex powder contacting face 38, which are all supported by the carriage 40 so as to be able to selectively traverse a powder bed in the build box. The powder dispenser 32 includes a hopper 42 for containing a desired amount of a build powder and an opening (not depicted) through which the powder is selectively discharged. The elements and mechanism for the powder dispenser 32 is not particularly limited and may include any variety of powder dispensers that are adapted to dispense selected or controlled amounts of powder to the powder bed of the powder-layer three-dimensional printer. While the smoothing device 34 and powder dispenser 32 are shown as being connected to recoater 30, it is to be understood that in some embodiments the smoothing device 34 does not have to be physically connected with the powder dispenser 32 and may be independently operable apart from the powder dispenser 32. Such an arrangement permits the movement of the smoothing device to be independent from the movements other parts of the recoater, even though such movements may be coordinated with each other. For example, when the recoater and powder dispenser are not physically connected, the smoothing device may operate and travel in a direction opposite, perpendicular or at an angle relative to the direction of travel for the powder dispenser.

The smoothing device 34 includes a counter rotating roller 36 having a complex powder engaging face 38. The counter rotation of the roller is a direction in which the direction of rotation about the rotational axis is opposite or counter to the direction in which the roller would rotate if it were rolling along the plane of the powder bed. The counter rotating roller 36 is preferably motorized such that the speed of rotation is adjustable by the user.

The complex powder engaging face 38 is a machined or wrapped face of the counter rotating roller which increases the interaction, friction, and/or shear force between the roller and powder applied to and/or contained in the powder bed relative to a cylindrical roller having a regular cylindrical face. The complex powder engaging face 38 may include, but is not limited to, features such as bumps, grooves, ridges, flutes, knurling, and edges on the cylindrical surface of the roller. The complex powder engaging face 38 may be a face that had been bead or bit blasted to form the surface.

The counter rotation and the complex powder engaging face 38 of the counter rotating roller 36 provide a shearing force to the surface of the deposited powder in the powder bed as the counter rotating roller 36 moves across a powder bed. In this way, the counter rotating roller 36 removes excess powder from high portions the powder bed surface and redistributes powder to low spots or depressions in the powder layer and removes excess powder from the build box.

In some embodiments, the counter rotating roller includes at least one flute extending along at least a portion of the rotational axis of the counter rotating roller. A flute includes an elongated groove or recess formed on the face of the counter rotating roller that forms an edge adapted to engage powder deposited on or contained within the build box. The complex powder engaging face preferably includes at least one or a plurality of flutes extending along at least a portion of the rotational axis. In some embodiments, the one or more flutes extend the length of the counter rotating roller. In some embodiments, the number of flutes may range from about 2 to about 40, and preferably from about 2 to about 10. The flutes may be straight, i.e., extending parallel with the rotational axis of the counter rotating roller or the flutes may be helical flutes twisting around the rotational axis.

The twist ratio of the helical flutes is not particularly limited and may vary based on design considerations. As used herein, the "twist ratio" refers to the number of revolutions of the flute about the rotational axis of the roller to the length or distance of the roller in inches and may be expressed as rotation: distance in inches. In general, a higher twist ratio would be desired to remove less material, while lower twist ratios would be desired for removing more material. In some embodiments, the twist ratio of the flutes may range from about 1 to about 0.75 inches (1:0.75) up to about 1 to about 50 inches (1:50), and preferably ranges from about 1 to about 2 inches (1:2) to about 1 to about 15 inches (1:15). In certain embodiments, the twist ratio may be about 1 to about 7 inches (1:7). The shape of the flute is not particularly limited, however it is desirable that the flute contain an edge for contacting the powder bed that is adapted to shear excess powder from the top powder layer of the powder bed. The flute may include a channel or recess for receiving and removing the sheared, excess powder away from the powder bed.

Figure 4:
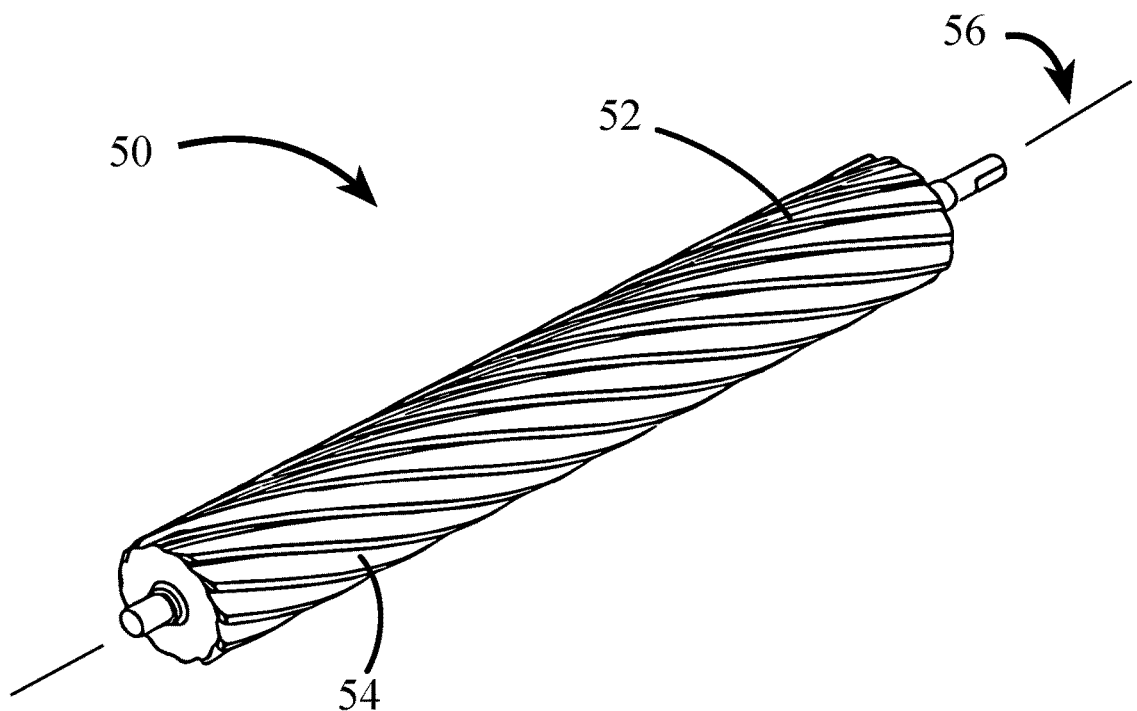
FIG. 4 is an isometric perspective view of a counter rotating roller having a fluted face in accordance with an embodiment.

With reference now to FIG. 4, there is shown an embodiment of a counter rotating roller 50 having a complex powder engaging face 52 that includes a plurality of flutes, one such flute represented by the reference numeral 54. The flutes 54 are helical and extend along the axis of rotation 56.

Figure 5:
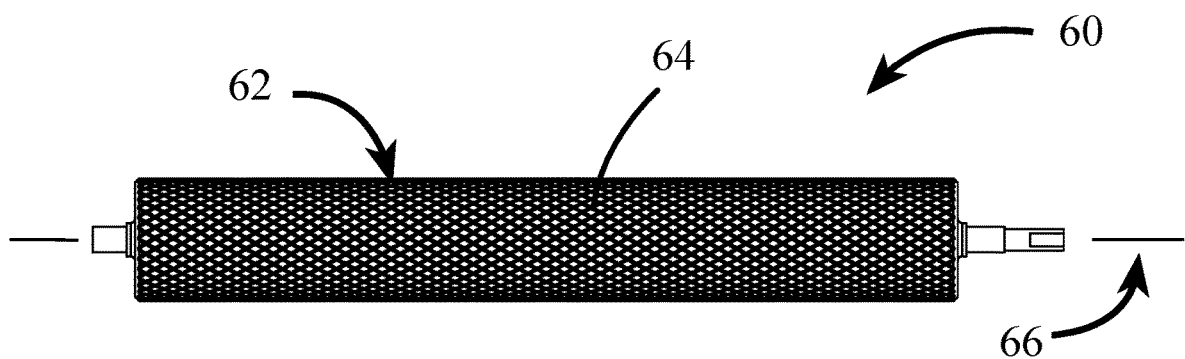
FIG. 5 is side view of a counter rotating roller having a knurled face in accordance with an embodiment.

In other embodiments, the complex powder engaging face may include knurling along at least a portion of the rotational axis of the counter rotating roller. Knurling may include a pattern of straight, angled or crossed ridges, or a pattern of squares or diamonds. With reference to FIG. 5, there is illustrated a counter rotating roller 60 accordance with an embodiment of the invention. The counter rotating roller 60 includes a complex powder engaging face 62 with knurling 64 in the form of a pattern of diamonds extending along the rotational axis 66.

The materials used to make the counter rotating roller may include metals, such as stainless steel, ceramics, or other rigid machinable materials. In many embodiments, the complex powder engaging face may be created by machining the desired pattern into the body of the counter rotating roller. Alternatively, a wrap or sleeve having the desired complex powder engaging face may be used over the counter rotating roller. Additionally the diameter of the counter rotating roller is not particularly limited. In some embodiments, the diameter of the counter rotating roller may range from about 0.25 inches to about 6 inches, preferably from about 0.25 inches to about 2 inches, and in some embodiments from about 0.25 inches to about 1 inch.

While surface of the powder bed created by the counter rotating roller may be suitable for many printing operations, it may be desirable to further smooth and/or compact the powder layer. To this end and with reference to FIGS. 3A and 3B, the smoothing device 34 may include a vertically adjustable finishing roller 35 to follow the counter rotating roller 36 as the carriage 40 moves across or traverses the build box. The finishing roller 35 is vertically adjustable, i.e., in a direction that is normal or orthogonal relative to the direction of travel of the carriage 40, such the face of the finishing roller 35 may be adjusted to be above or below the lowest portion of the complex powder engaging face 38 of the counter rotating roller 36. Preferably, the finishing roller is positioned such the finishing roller face is positioned below the complex powder engaging face 38 of the counter rotating roller 36. In certain embodiments, the finishing roller 35 may be a regular cylinder having a regular, smooth cylindrical face. In some embodiments, the finishing roller 35 is motorized and can roll or rotate in the same direction or the opposite direction as the counter rotating roller 36. With excess powder having been removed or redistributed by the counter rotating roller, the finishing roller is adapted to compress or trowel a minimum amount of powder to further smooth and compact the deposited powder. The diameter of the finishing roller may be the same or different than the diameter of the counter rotating roller. The diameter for the finishing roller is not particularly limited. In some embodiments, the diameter of the finishing roller may range from about 0.25 inches to about 6 inches, preferably from about 0.25 inches to about 2 inches, and in some embodiments from about 0.25 inches to about 1 inch.

It is also to be understood that in some embodiments, the smoothing device may be employed selectively, i.e. only for selected layers and/or only for selected portions of selected layers, or for all layers. Further, in some embodiments a plurality of smoothing devices may be utilized. Such smoothing devices may be used with the powder-layer three-dimensional printer and may include the same type or different types of counter rotating rollers and finishing rollers.

EXAMPLE

Figure 1B:
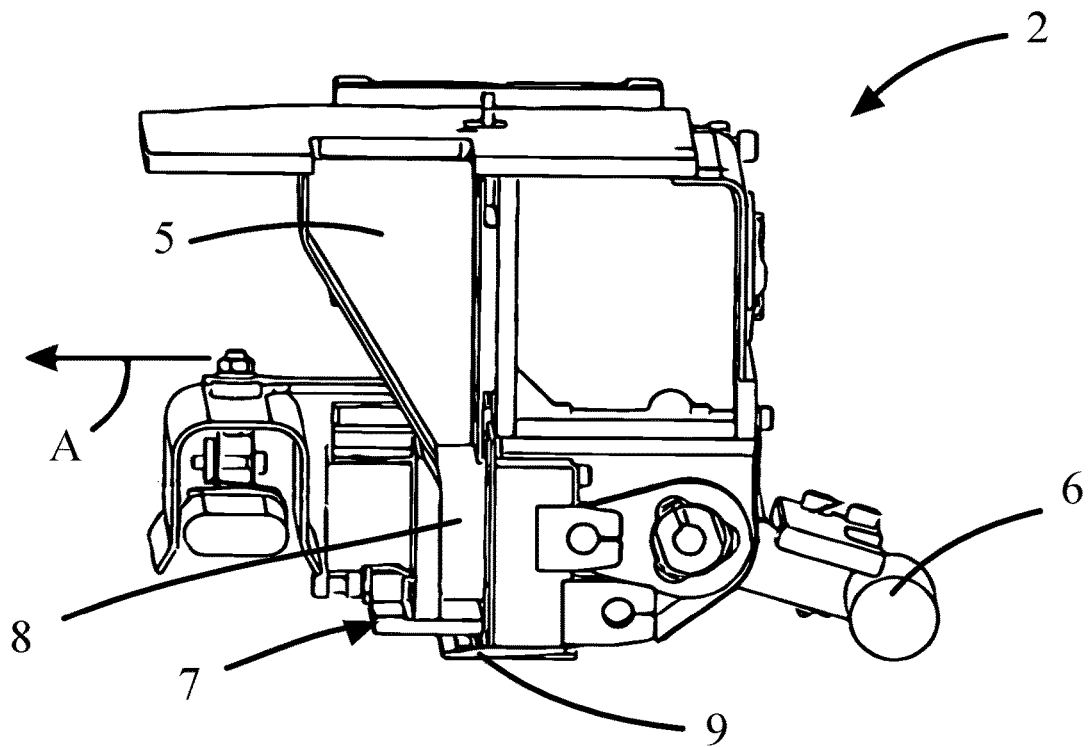
FIG. 1B is an isometric cross-sectional view of the prior art recoater of FIG. 1A sectioned along cutting plane 1B-1B of FIG. 1A.

A 9 micron 316 stainless steel powder was spread across a powder bed. In the first trial a recoater similar to that in FIGS. 1A and 1B was used where the smoothing device was a regular smooth cylinder. In the second trial a recoater according to the present invention which was similar to that illustrated in FIGS. 3A and 3B was used where the smoothing device included the fluted counter rotating roller depicted in FIG. 4. In the third trial, a recoater according to the present invention which was similar to that illustrated in FIGS. 3A and 3B was used where the smoothing device included the knurled counter rotating roller depicted in FIG. 4. The speed at which the recoating process provided a uniform powder layer without introducing significant defects were measured. The recoater in the first trial achieved a speed of about 5 mm/sec, while recoater in the second and third trials achieved about 85 mm/sec and about 125 mm/sec respectively.

While only a few embodiments of the present invention have been shown and described, it will be obvious to those skilled in the art that many changes and modifications may be made thereunto without departing from the spirit and scope of the invention as described in the claims. All United States patents and patent applications, all foreign patents and patent applications, and all other documents identified herein are incorporated herein by reference as if set forth in full herein to the full extent permitted under the law.

What is claimed is:

1. A powder-layer three-dimensional printer comprising:
a build box adapted to contain a powder bed;
a smoothing device comprising a counter rotating roller having a rotational axis and wherein the counter rotating roller comprises a complex powder engaging face extending along the rotational axis and is adapted to apply a shearing force to the surface of deposited powder in the powder bed; and
a carriage adapted to move the smoothing device across the build box.

2. The powder-layer three-dimensional printer of claim 1, wherein at least a portion of the complex powder engaging face comprises at least one flute extending along the rotational axis.

3. The powder-layer three-dimensional printer of claim 2, wherein each of the at least one flute comprises a straight groove parallel with the rotational axis.

4. The powder-layer three-dimensional printer of claim 2, wherein each of the at least one flute is a helical flute twisting around the rotational axis.

5. The powder-layer three-dimensional printer of claim 4, wherein the at least one flute has a twist ratio in the range of from about 1 to about 0.75 inches to about 1 to about 50 inches.

6. The powder-layer three-dimensional printer of claim 1, wherein at least a portion of the complex powder engaging face comprises knurling extending along the rotational axis.

7. The powder-layer three-dimensional printer of claim 5, wherein the knurling comprises a pattern of diamonds.

8. The powder-layer three-dimensional printer of claim 5, wherein the knurling comprises a pattern of straight ridges.

9. The powder-layer three-dimensional printer of claim 1, wherein the smoothing device further comprises a vertically adjustable finishing roller positioned on the carriage such that the finishing roller follows the counter rotating roller as the carriage moves across the build box.

10. The powder-layer three-dimensional printer of claim 9, further comprising a powder dispenser positioned on the carriage such that the counter rotating roller is positioned between the powder dispenser and the vertically adjustable finishing roller.

11. The powder-layer three-dimensional printer of claim 1, further comprising a powder dispenser adapted to provide build powder in the build box, wherein the smoothing device further comprises a vertically adjustable finishing roller positioned on the carriage such that the finishing roller follows the counter rotating roller as the carriage moves across the build box, and wherein the powder dispenser and the smoothing device are independently moveable.

12. A powder-layer three-dimensional printer comprising:
a build box adapted to contain a powder bed;
a smoothing device comprising a counter rotating roller having a rotational axis and a complex powder engaging face extending along the rotational axis wherein at least a portion of the complex powder engaging face comprises knurling extending along the rotational axis and is adapted to apply a shearing force to the surface of deposited powder in the powder bed; and
a carriage adapted to move the smoothing device across the build box.

13. The powder-layer three-dimensional printer of claim 12, wherein the knurling comprises a pattern of diamond.

14. The powder-layer three-dimensional printer of claim 13, comprises a pattern of straight ridges.

* * * * *